F. WILLIAMS.
SAW FILING MACHINE.
APPLICATION FILED JULY 27, 1915.
1,223,131.
Patented Apr. 17, 1917.
3 SHEETS—SHEET 1.
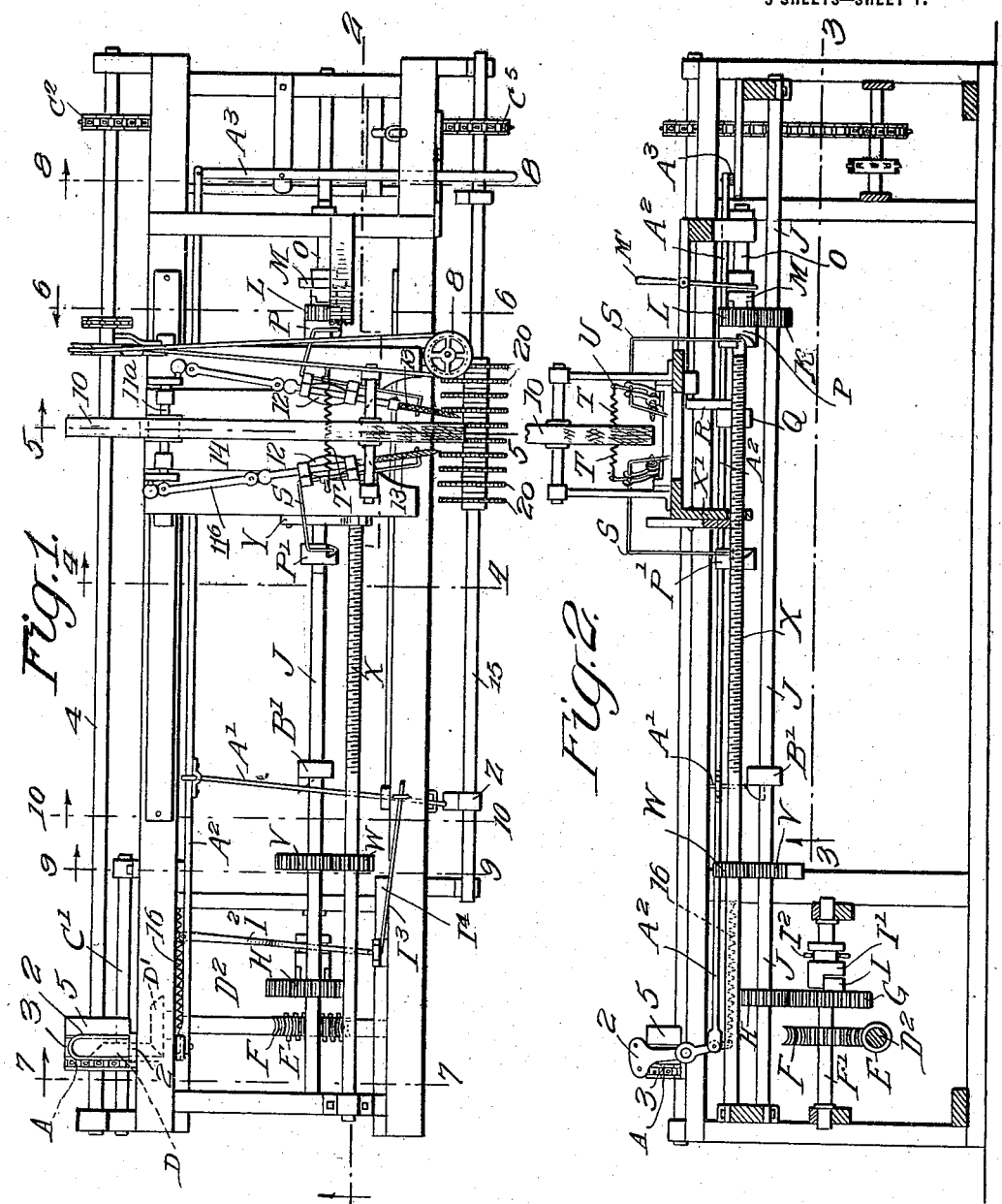
WITNESSES:
INVENTOR
FRENCH WILLIAMS
BY Munn & Co.
ATTORNEYS

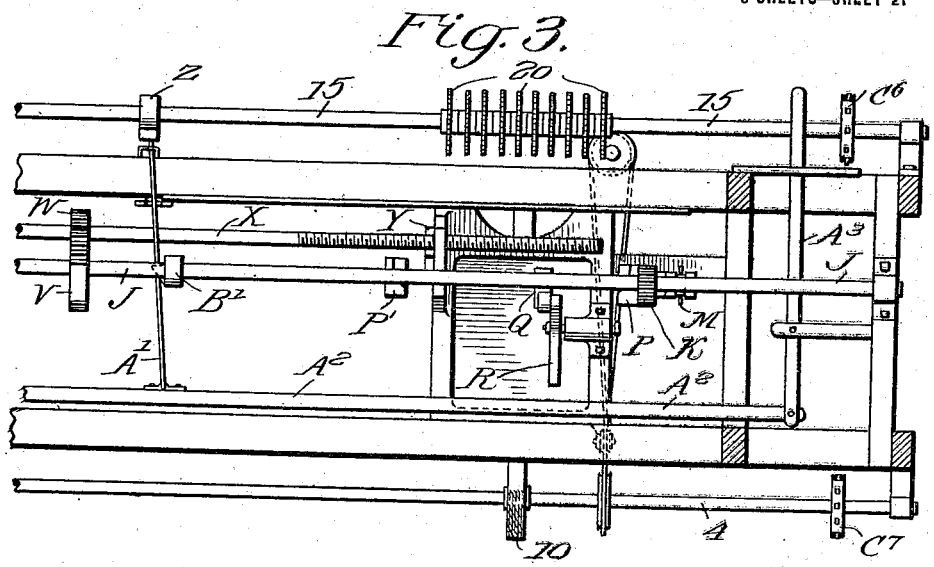
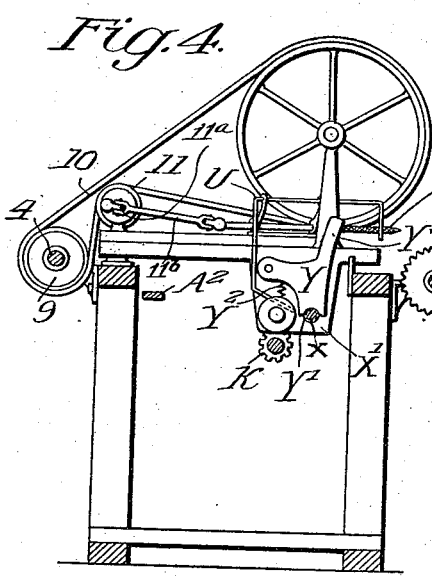
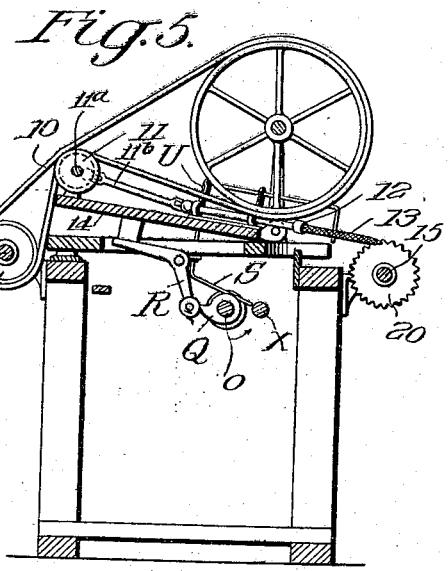

F. WILLIAMS.
SAW FILING MACHINE.
APPLICATION FILED JULY 27, 1915.
1,223,131.
Patented Apr. 17, 1917.
3 SHEETS—SHEET 3.
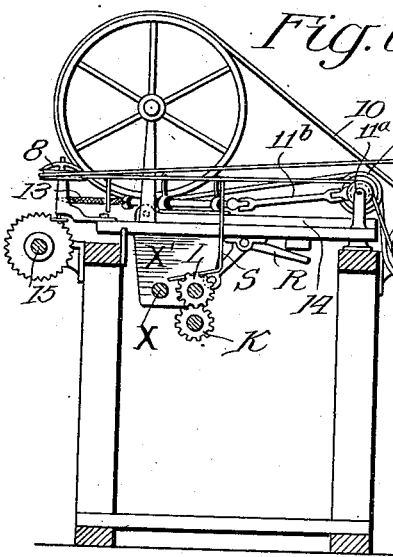
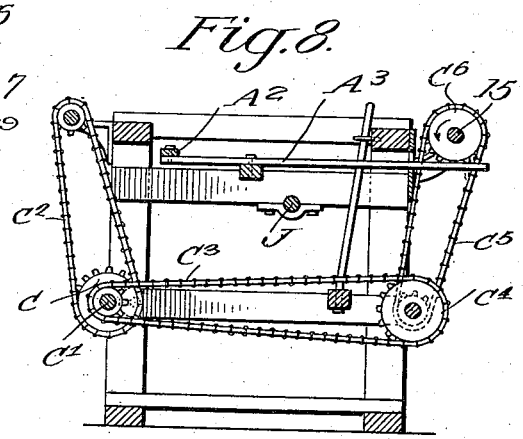
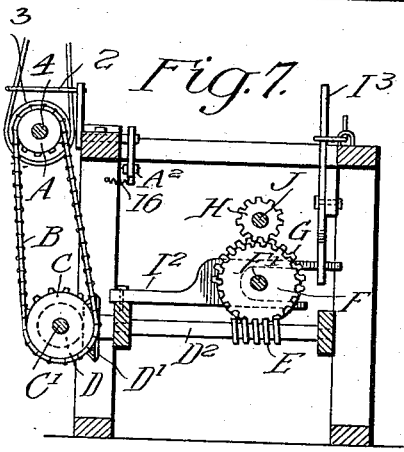
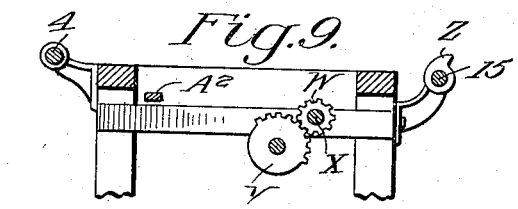
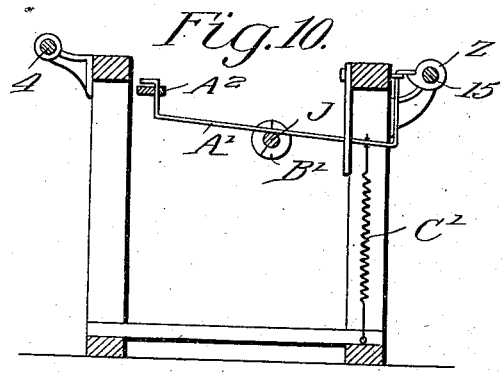
WITNESSES:
Samuel E. Wade.
Geo. S. Brock.
INVENTOR
FRENCH WILLIAMS
BY Munn & Co.
ATTORNEYS

UNITED STATES PATENT OFFICE.

FRENCH WILLIAMS, OF LITTLE ROCK, ARKANSAS, ASSIGNOR OF ONE-HALF TO JOHN HOGAN, OF LITTLE ROCK, ARKANSAS.

SAW-FILING MACHINE.

1,223,131.      Specification of Letters Patent.      Patented Apr. 17, 1917.

Application filed July 27, 1915. Serial No. 42,133.

*To all whom it may concern:*

Be it known that I, FRENCH WILLIAMS, a citizen of the United States, and a resident of Little Rock, in the county of Pulaski and State of Arkansas, have invented certain new and useful Improvements in Saw-Filing Machines, of which the following is a specification.

My invention relates to imprvements in saw filing machines, and more particularly to machines for sharpening gin saws and the like, and has for an object to provide means whereby the file carriage is automatically moved from one saw to another.

With these and other objects in view, my invention consists in certain novel features of construction, arrangement and combination of parts as will be hereinafter described and pointed out in the claims, reference being had to the accompanying drawings in which—

Figure 1 is a top plan view of my improvements applied to a saw filing machine of the Carver type;

Fig. 2 is a vertical sectional view taken on the line 2—2 of Fig. 1;

Fig. 3 is a sectional plan view of a portion of the underside of the device, taken on line 3—3 of Fig. 2;

Fig. 4 is a transverse vertical section on line 4—4 of Fig. 1;

Fig. 5 is a transverse vertical section on the line 5—5 of Fig. 1;

Fig. 6 is a transverse section on line 6—6 of Fig. 1;

Fig. 7 is a transverse vertical section on line 7—7 of Fig. 1;

Fig. 8 is a transverse vertical section on line 8—8 of Fig. 1;

Fig. 9 is a transverse vertical section on line 9—9 of Fig. 1, and

Fig. 10 is a transverse vertical section on line 10—10 of Fig. 1.

Referring more particularly to the drawing, wherein I have represented the preferred form of my invention, 11 designates the frame composed as usual of longitudinal beams, cross beams and uprights. At the rear of the frame the main drive shaft 4 is supported in suitable bearings and on this shaft is a fast pulley 5 which drives said shaft, while a loose or idle pulley 3 is also carried on the shaft 4.

2 represents a belt shifter of known construction and used on well known machines of this type, for shifting the driving belt from drive pulley 5 to idle pulley 3, or vice versa. On shaft 4 a small sprocket chain B runs to sprocket wheel C on a short countershaft C. On shaft $C'$ is mounted a bevel gear D meshing with another bevel gear $D'$ mounted on transverse shaft $D^2$ which carries worm E meshing with worm wheel F on the shaft $F'$ carrying mutilated pinion G, one face of which has a clutch member I which is a mate of clutch member $I'$, operable by the yoke lever $I^2$ mounted in the frame.

A pinion H on the main shaft J is engaged by the toothed portion of pinion G, and on the shaft J is a spur gear K which meshes with a spur gear L on the countershaft O. On the counter-shaft O at each side of the file carrier are mounted the cam notched wheels P which actuate the presser arms S. On shaft O is also mounted a cam Q which is adapted to operate the lift lever R which raises and lowers the file carriage. The file carriage also carries the saw gumming device 8 and having the files 13 mounted in the file holders 12.

The files are operated from shaft 4 through pulley 9, belt 10 running over pulley 11 on crank shaft $11^a$ which in turn imparts motion through a pitman to the file holders. The saw carrying shaft or mandrel 15 is suitably mounted in suitable bearings at the front of the frame and derives its power from shaft 4 through a well known sprocket and chain gearing, as illustrated in Fig. 8 of the drawing; this consists of the sprocket chain $C^2$ driving sprocket C which drives sprocket chain $C^3$ which drives sprocket $C^4$ giving motion to sprocket chain $C^5$ driving sprocket wheel $C^6$ on shaft 15, the belt shifting mechanism $A'$ being operated from the right front end of the machine through the connections $A^2$ and $A^3$.

The file carriage 14 is mounted to slide on the front and rear beams of frame work at its forward and rear ends as in the known types of machines of this class, the countershaft O extending beneath said carriage and carried thereby.

X is a shaft, screw threaded a portion of its length being supported at its left hand end in the frame above and slightly forward of shaft J; the other or threaded end of shaft X passes loosely through a bracket $X'$ which also supports one end of counter-shaft O.

The shaft X also has mounted on it the pinion W which is driven by a pinion V from shaft J. Y is a lever pivoted at one end to the bracket X' and having a projection having a semi-circular cut-out lower face which is threaded and forms a half-nut to fit shaft X, the lever being held to the shaft X by the coiled spring $Y^2$. It can be thrown out of mesh with the shaft X by the upwardly projecting finger piece $Y^3$.

The operation of the machine is as follows:

Power is conveyed to shaft 4 through pulley 5 driven by a belt from the motor. A small belt 10 gives power to pulleys 11, which through crank shaft 11$^a$, drives the file holders 12 carrying files 13 to move forward and backward, the files 13 sharpening the points of the saw teeth. The shaft 15 carrying the saws revolves toward the files; to this point the operation of the machine is that of the ordinary Carver machine. It is now necessary to move the second saw into the path of the files, and this is done in the following manner:

The cam trip Z comes in contact with the lever A' raising it above trip B' on shaft J, allowing the spring 16 to move belt shifter 2 to force the belt over on idle pulley 3 causing shaft 4 to stop, the idle pulley 3 having the sprocket wheel A attached to it. Sprocket wheel A being thus put in motion gives motion to sprocket chain B which drives sprocket wheel C driving bevel gear D, worm shaft E, worm wheel F and mutilated gear G.

The small spur gear H is driven by G causing shaft J to revolve, which carries spur gear K. K meshing with spur gear L on counter-shaft O causes notched wheels P, P' to revolve, forcing presser shafts S to move outwardly, removing the pressure of the files from the saws, the cam Q also revolving and permitting lever R to move downwardly. At this point the teeth on the mutilated spur gear V come in contact with small spur gear W which revolves the screw shaft X, one revolution of said shaft being equivalent to the distance between the saws 20 on the saw shaft 15.

The pitch of the threads on the lever or half nut Y being the same as those of the shaft X and being pivotally bolted to the file carriage, it rests on the said shaft X and is held thereto by the coil spring $Y^2$ whereby the revolution of said shaft X causes the movement of the file carriage a distance equal to the distance between the saws.

At this particular step in the operation of the mechanism the cam trip Q having made its revolution, comes in contact with lift lever R forcing R outward and upward, raising the file carriage thereby and forcing the files downwardly to the saws, as shown in Fig. 5. The notched wheels P, P' having also made a complete revolution allow spring T to move the rocker or presser arms S into notches on P, thereby permitting pressure back on the files. When the attendant of the machine wants the files to remain elevated he pushes or pulls handle M' (Fig. 2) which engages the member M of clutch on shaft O; the other member of this clutch is formed on one face of pinion L; this breaks connections between L and M which permits pinion L to idle on shaft O.

To prevent the files hanging on top of saws while in the act of being lowered the arms S are used in such a manner that when one end is forced out of notch in P the other end presses against the file carriers. The spring T is connected to the file carriers so that when shaft O revolves sufficiently to permit end of S to drop back in notch of wheel P said spring will hold S there until it is again forced out.

Now B' having made the revolution the cam point of B' forces A' outward, which operates belt shifter 2, forcing the driving belt back on pulley 5. The files now begin sharpening the saw that they have been moved forward to.

When all the saws have been filed the carriage comes in contact with rod $I^4$ attached to the upper end of lever $I^3$ the lower end of which engages one end of the forked bar $I^2$ which engages one member I' of the clutch, to throw it out of engagement with the other member I. This renders the machine inoperative until the full carriage is moved back beyond where it may come again in contact with rod $I^4$. In order to put the machine in operation again, the operator must throw clutch members I I' into engagement with each other again. U designates the file caps and presser shaft holders. The operation of the clutch I', $I^2$, $I^3$ is as follows: The file carriage in moving longitudinally on the frame pushes the rod attached to $I^3$ which pushes $I^2$ which in turn pushes I'; this breaks connection between I and I' and permits pinion G to idle, thereby stopping longitudinal movement of the carriage.

I claim:

1. A gin saw filing machine, comprising in combination a frame, a saw carrying shaft or mandrel supported by said frame, a plurality of saws carried by said shaft, means for continuously rotating said shaft, a file carriage and filing means thereon slidably mounted on the frame, an operating means for mutually driving the saw shaft, moving the carriage and the filing mechanism, means for raising and lowering the files, means for preventing the files from hanging on top of the saws while being lowered, and means for automatically moving the file carriage and filing mechanism from one saw to the next adjacent saw.

2. A gin saw filing machine, comprising in combination a frame, a gin saw carrying shaft or mandrel supported thereon, a plurality of gin saws mounted on said shaft or mandrel, a carriage slidable longitudinally on said frame, saw filing mechanism mounted on said carriage, means for mutually driving the saw mandrel and filing mechanism and revolving and reciprocating the same respectively, means for automatically moving the carriage longitudinally, clutch means to stop automatic movement of the carriage, and means operated by said carriage moving means to raise the filing mechanism out of engagement with the saws prior to sliding of the carriage.

3. A gin saw filing machine, comprising in combination, a frame, a saw carrying mandrel having a series of saws thereon and supported by said frame, a carriage mounted to slide longitudinally on said frame, a saw filing mechanism operably mounted on said carriage, means for revolving the saw mandrel and reciprocating the file mechanism, and means for lifting the file carriage out of engagement with the saws to permit longitudinal movement of the carriage, means for lowering the files, and automatic means for preventing files from hanging on top of saws during such lowering movement.

4. A gin saw filing machine, comprising in combination a frame, a saw mandrel supported on said frame and carrying a series of circular saws, a carriage mounted on the frame and slidable longitudinally thereon, a filing mechanism on said carriage, a drive shaft common to the saw mandrel and filing mechanism and for revolving the saw mandrel and reciprocating the filing mechanism, means for sliding the carriage longitudinally, means for periodically lifting said carriage, and means carried by the carriage moving means for engaging and operating the carriage lifting means.

5. A gin saw filing machine, comprising in combination a frame, a saw mandrel supported thereon and carrying a series of spaced apart gin saws, a carriage mounted on said frame and movable longitudinally thereon, a filing mechanism carried by said carriage, a main drive shaft, means for sliding the carriage longitudinally of the frame operable from the main drive shaft and comprising a screw shaft adapted to engage the file carriage, a carriage lifting mechanism mounted on said carriage and operable from a counter-shaft, and adapted to throw the filing mechanism into and out of engagement with the saws.

6. A gin saw filing machine, comprising in combination, a frame, a saw mandrel supported thereon and carrying a series of spaced apart saws, a carriage mounted to slide longitudinally on said frame, a filing mechanism on said carriage, driving mechanism common to the saw mandrel and filing mechanism for revolving and reciprocating the mandrel and filing means respectively, means operated by the driving mechanism for moving the carriage longitudinally of the frame, and cam means periodically brought into operable engagement with the driving mechanism to move the filing mechanism out of engagement with the saws prior to each longitudinal movement of the carriage.

7. A gin saw filing machine, comprising in combination a frame, a saw mandrel supported thereon and carrying a plurality of spaced apart circular saws, a file carriage mounted on the frame and adapted to slide longitudinally thereon, filing mechanism mounted on the carriage, driving mechanism common to the mandrel and filing mechanism to revolve and reciprocate the same respectively, means connected with the driving mechanism for causing longitudinal movement of the carriage, and means alternately thrown into and out of gear with the driving mechanism to raise and lower the filing mechanism to cause their engagement and disengagement with the saws, said means comprising a counter-shaft carried on the file carriage, a cam carried by said counter shaft, and a lever mounted on the carriage and engaged by said cam.

8. A gin saw filing machine comprising in combination, a frame, a saw mandrel supported thereon and carrying a plurality of spaced apart circular saws, a file holding carriage mounted to slide longitudinally on said frame, saw filing mechanism mounted on said carriage, driving mechanism common to the mandrel revolving and file reciprocating mechanism, means for raising and lowering the filing mechanism out of and into engagement with the saws, means actuated by the file raising and lowering mechanism to cause longitudinal movement of the carriage after each lowering of the file mechanism, and means for shifting power from the driving mechanism to the carriage raising and lowering mechanism, operable by the saw mandrel at every revolution of the same to shift the driving mechanism.

9. A gin saw filing machine, comprising in combination a frame, means for supporting a plurality of spaced apart circular saws, a filing mechanism on said frame and slidable longitudinally thereon, means for rotating the saws, means for operating the filing mechanism to sharpen the saws successively, and means for throwing the filing mechanism out of engagement with the saws upon completion of the sharpening of each saw, said means comprising a main shaft, a file carriage, a half nut mounted on said carriage, a screw threaded shaft mounted in the frame and engaged by the said half-nut, a cam projection mounted on a counter-shaft mounted on the carriage, a bell crank lifting lever mounted on the carriage, and gear connections between the main shaft and the screw threaded shaft for automatically communicating motion to the lifting lever periodically.

10. A gin saw filing machine comprising in combination a frame, a mandrel carrying a plurality of spaced apart circular saws thereon, a file carriage mounted to be moved longitudinally on said frame, filing mechanism mounted on said carriage, means for rotating the saws, means for operating the filing mechanism, means for moving the filing mechanism into and out of engagement with the saws upon the completion of each saw, said means comprising a screw threaded shaft mounted in the frame, a half nut held in threaded engagement with the threaded shaft by elastic means, a counter-shaft, a cam projection mounted on the counter shaft, a bell crank lever pivoted to the carriage, one end adapted to be engaged by the cam projection, the other end adapted to engage the file carrying mechanism to raise and lower the same and thus throw the filing mechanism into and out of action.

FRENCH WILLIAMS.

Witnesses:
JOHN HOGAN,
R. P. MARTIN.

Copies of this patent may be obtained for five cents each, by addressing the "Commissioner of Patents, Washington, D. C."